(12) United States Patent
Fukushima

(10) Patent No.: US 7,293,374 B2
(45) Date of Patent: Nov. 13, 2007

(54) CRAWLER FRAME FOR CONSTRUCTION MACHINE

(75) Inventor: Akira Fukushima, Komatsu (JP)

(73) Assignees: Komatsu Ltd., Tokyo (JP); Hitachi Construction Macinery Co., Ltd., Tokyo (JP)

( * ) Notice: Subject to any disclaimer, the term of this patent is extended or adjusted under 35 U.S.C. 154(b) by 66 days.

(21) Appl. No.: 10/719,284

(22) Filed: Nov. 20, 2003

(65) Prior Publication Data

US 2004/0107607 A1 Jun. 10, 2004

(30) Foreign Application Priority Data

Dec. 6, 2002 (JP) .............................. 2002-356088

(51) Int. Cl.
*E02F 3/58* (2006.01)
(52) U.S. Cl. .......................... 37/397; 37/395; 180/311; 212/180
(58) Field of Classification Search ................. 37/395, 37/397, 348; 180/9.1, 9.44, 9.5; 212/175, 212/180, 181; 280/797, 781, 798, 793
See application file for complete search history.

(56) References Cited

U.S. PATENT DOCUMENTS

| | | | |
|---|---|---|---|
| 2,156,565 A | | 5/1939 | Johnston et al. |
| 3,037,571 A | | 6/1962 | Zelle |
| 3,757,881 A | * | 9/1973 | Short et al. .................. 180/9.1 |
| 4,069,637 A | * | 1/1978 | Braithwaite .................. 37/379 |
| 4,231,699 A | * | 11/1980 | Thompson .................. 414/687 |
| 4,249,625 A | * | 2/1981 | Palm .......................... 180/6.7 |
| 4,361,242 A | * | 11/1982 | Dion et al. .................. 212/253 |
| 4,387,779 A | * | 6/1983 | Pisani ........................ 180/9.5 |
| 4,391,341 A | * | 7/1983 | Taghon ...................... 180/9.1 |
| 4,397,481 A | * | 8/1983 | Dion et al. .................. 280/781 |
| 4,625,820 A | * | 12/1986 | Christian .................... 180/9.1 |
| 5,823,279 A | * | 10/1998 | Petzold ....................... 180/9.1 |
| 6,322,104 B1 | * | 11/2001 | Duppong et al. ........... 280/781 |
| 6,588,521 B1 | * | 7/2003 | Porubcansky et al. ....... 180/9.1 |
| 6,637,111 B2 | * | 10/2003 | Sasaki et al. ................. 29/891 |
| 6,719,075 B2 | * | 4/2004 | Kamikawa .................. 180/9.1 |
| 2004/0232687 A1 | * | 11/2004 | Kubo et al. ................. 280/781 |
| 2005/0167967 A1 | * | 8/2005 | Urase et al. ................. 280/781 |
| 2005/0225069 A1 | * | 10/2005 | Urase et al. ................. 280/781 |

FOREIGN PATENT DOCUMENTS

| | | | |
|---|---|---|---|
| JP | 62-59577 U | | 4/1987 |
| JP | 05319320 | * | 12/1993 |
| JP | 08-072615 A | | 3/1996 |
| JP | 08319635 | * | 12/1996 |
| JP | 09100552 | * | 4/1997 |

(Continued)

*Primary Examiner*—Thomas A Beach
(74) *Attorney, Agent, or Firm*—Frishauf, Holtz, Goodman & Chick, P.C.

(57) ABSTRACT

A crawler frame includes a center frame and right and left track frames disposed at right and left sides of the center frame so as to extend in a back and forth direction, wherein legs for connecting a central frame section of the center frame to the track frames are formed from cast steel in order that washing can be easily done by reducing the amount of mud to be adhered to and deposited on the legs and in order that easy manufacture may be possible.

8 Claims, 10 Drawing Sheets

FOREIGN PATENT DOCUMENTS

| | | | |
|---|---|---|---|
| JP | 09209402 | * | 8/1997 |
| JP | 10266265 | * | 10/1998 |
| JP | 11-093209 A | | 4/1999 |
| JP | 2000142497 | * | 5/2000 |
| JP | 2000-230252 A | | 8/2000 |
| JP | 2001106128 | * | 4/2001 |
| JP | 2004268762 | * | 7/2003 |
| JP | 2003-267274 | | 9/2003 |
| WO | WO 03/042022 A1 | | 5/2003 |

* cited by examiner

3(a)

3(b)

3(c)

6(a)

6(b)

6(c)

6(d)

6(e)

CRAWLER FRAME FOR CONSTRUCTION MACHINE

TECHNICAL FIELD

The present invention relates to a crawler frame for a construction machine and more particularly to a crawler frame well suited for use in the undercarriage of a hydraulic excavator or the like.

BACKGROUND ART

There has been known a turnable material handling vehicle such as a hydraulic excavator, wherein a crawler travel system including right and left rotatable crawlers (caterpillars) is employed and this crawler travel system has a crawler frame as a system body.

The crawler frame for a turnable material handling vehicle of this type generally includes a center frame. This center frame has, at its center, a swing bearing with a ring gear for rotatably supporting a revolving frame on which an excavating system (excavating implement), cabin, engine, bonnet and others are mounted; and a right and left pair of track frames coupled to the right and left ends, respectively, of the center frame so as to extend in a back and forth direction. Provided at the front and rear ends of the track frames are idlers and drive wheels around which the crawlers are wound respectively.

In the prior art, for stably sustaining the load of the upper revolving superstructure, four coupling legs formed by sheet-metal welding of a steel plate are provided in total at the four corners of the center frame as a means for coupling the center frame and track frames of the crawler frame. Also, a frame structure is employed which assumes a substantially H-shape or X-shape in plan on the whole.

In the track frame disclosed in Japanese Patent Kokai Publication No. 11-93209 for example, the center frame having a swing bearing at the center thereof is coupled to the track frames with substantially H-shaped coupling legs formed by sheetmetal welding of a steel plate or the like. In the center frame, a central plate section corresponding to a bed plate on which the swing bearing is mounted is supported at the underside thereof by central wall sections (front and rear vertical walls) side wall sections which are formed by bending so as to incline from the central wall sections toward the track frames and a right and left pair of coupling wall sections for coupling the central wall sections to each other. With these wall portions, the load imposed on the swing bearing is directly sustained. An upper coupling plate and a lower coupling plate are welded to the upper and lower ends of these front and rear vertical walls, respectively.

The upper coupling plate is comparatively wide in the back and forth direction and constituted by a flat plate extending to the right and left track frames. Therefore, flying and penetrating mud is likely to adhere to and deposit on the top face of the upper coupling plate as excavating and carrying operation by a construction machine such as a hydraulic excavator proceeds, although the upper coupling plate is more or less inclined toward the right and left track frames.

In the track frame disclosed in Japanese Patent Kokai Publication No. 8-72615, the center frame having a swing bearing at the center thereof is coupled to the track frames with substantially H-shaped coupling legs formed from a steel plate or the like. The member on which the swing bearing is mounted is a round body located at the center of the center frame. The load imposed on the swing bearing is directly sustained by the round body located at the center and four legs extending to the right and left track frames are secured by welding to the round body.

The four legs are formed from appropriate vertical sheet members in order to sustain the load imposed on the swing bearing. Since the top face of each leg is constituted by a flat steel plate relatively moderately inclining toward one of the track frames, flying and penetrating mud is likely to adhere to and deposit on the top face.

In the track frame disclosed in Japanese Patent Kokai Publication No. 2000-230252, the center frame having a swing bearing at the center thereof is coupled to the track frames with substantially X-shaped coupling legs formed by sheet metal welding of a steel plate or the like. In the center frame, the bed plate on which the swing bearing is mounted is supported by right and left side vertical members, a front vertical member and a rear vertical member, and the load imposed on the swing bearing is directly sustained by these vertical members. Covering boards are welded to the upper ends and lower ends of these vertical members thereby forming four legs in a continuous fashion so as to extend to the right and left track frames.

The top face of each leg in this publication is also constituted by a flat steel plate which relatively moderately inclines toward one of the track frames so that flying and penetrating mud is likely to adhere to and deposit on the top face.

In the center frames of the above-cited publications, coupling of the right and left track frames is done by four legs which are formed by sheet metal welding of a steel plate or the like. For this reason, there arises such a problem that the steel plates used for forming the four legs have various shapes and therefore complicated blank layout is involved and the number of members increases.

In addition, many processes such as laying-out, cutting, bending and welding are involved, and many welding places as well as complicated weld lines make the number of welding processes increase, resulting in increased manufacturing time and manufacturing cost.

Further, the center frame has rightwardly extending legs and leftwardly extending legs which are coupled to the right and left track frames and the top faces of these legs are formed from flat steel plates relatively moderately inclining to the track frames, so that mud which flies and penetrates into the center frame during the excavating/revolving-carrying operation of the hydraulic excavator or during traveling of the hydraulic excavator adheres to and deposits on the top faces of the legs in large quantity.

The adhered and deposited mud will penetrate into the swing bearing with a ring gear positioned at the center of the upper part of the center frame and could be a cause of damage to the swing bearing.

Further, the mud which has adhered to and deposited on the legs moves to the top faces of the tracker frames and accumulates there, and this accumulated mud could be an obstacle to the rotation of the upper tracker rollers or a cause of lopsided wear of the upper tracker rollers.

The accumulated mud is removed by washing which, however, needs a lot of water for removal and many washing processes, resulting in increased cleaning cost.

In addition, a large amount of mud is left in the washing site after washing so that the liveries who rent construction machines such as hydraulic excavators have the problem of mud disposal.

The present invention has been directed to overcoming the foregoing problems and a primary object of the invention is therefore to provide a crawler frame for use in a construction machine, which crawler frame can be easily manufactured and easily washed because of less susceptibility to adhesion and deposition of mud.

DISCLOSURE OF THE INVENTION

The above object can be accomplished by a crawler frame for a construction machine according to the invention, which has a center frame and right and left track frames disposed on the right and left sides of the center frame so as to extend in a back and forth direction, wherein the center frame comprises a central frame section and legs for connecting the central frame section to the track frames, and the legs are formed from cast steel.

In the crawler frame for a construction machine according to the invention, since the legs for connecting the central frame section of the center frame to the track frames are formed from cast steel, it is unnecessary to connect the central frame section to the track frames by use of four legs formed by sheet metal welding of a steel plate etc. like the prior art which involves many processes. Additionally, since welding is required for the joint surfaces of the central frame section of the center frame and the legs and for the joint surfaces of the legs and the inner side wall faces of the track frames only, the number of welding places can be reduced and welding can be easily carried out, resulting in a significant reduction in the number of processes and processing time.

In addition, since the legs are formed from cast steel, their thickness can be easily varied according to the load of the upper revolving superstructure or the like imposed on the legs and, therefore, the internal stress of the legs can be made substantially uniform. For example, the portion of each leg which is located on the side of the track frame and subjected to great internal stress may be made thick and thickness is gradually reduced toward the leg portion on the side of the central frame section. With this arrangement, the weight of the centre frame can be reduced compared to the conventional center frames made from sheet metal.

Since the legs are formed from cast steel, there is such an advantage that the manufacture of the crawler frame can be extremely facilitated.

In the invention, the legs of the center frame preferably have a tubular shape and the top faces of the legs are convex in cross-section.

Since the top faces of the legs are convex, if mud is flied onto or penetrates to the top faces of the legs, the mud will easily drop to the ground without adhering and depositing. Even if flying or penetrating mud adheres to the convex portions of the top faces of the legs more or less, the adhering mud will be easily shaken off to the ground by vibration or the like occurring at the time of traveling, before it dries and anchors to the top faces. As a result, no mud adheres to and deposits on the convex portions of the top faces of the legs. Even if mud deposits on the top faces, its amount is negligible. Even if mud happens to adhere, it can be easily washed down to the ground by cleaning, thanks to the tubular shape of the legs with a convex top face.

Since there is no or little mud adhering to and depositing on the legs, there is no chance for mud to reach and penetrate to the swing bearing, giving damage thereto. In addition, since there is no or little mud adhering to and depositing on the legs, the amount of water required for cleaning is small and the number of cleaning process as well as the cleaning cost can be reduced. Further, the amount of mud left in the washing site after washing is very small so that the problem of mud disposal imposed on the livery or the like can be alleviated.

In the invention, the legs of the center frame may be in the shape of a cylindrical pipe having a circular cross-section.

In such a crawler frame, even if mud flies onto or penetrates to the top faces of the legs, adhering thereto, the mud will easily drop to the ground because the top faces of the legs are in the shape of a cylindrical pipe having a circular cross-section. Compared to the tubular legs having convex top faces, the legs in the shape of a cylindrical pipe having a circular cross section is somewhat less effective, but most of the mud coming to the legs will drop to the ground without adhering and depositing substantially similarly. The cylindrical pipe-like leg has the advantage that they are comparatively easily produced from cast steel.

In the invention, it is preferable that a joint flange section joined to the central frame section be provided at the inner end of each leg and a joint flange section joined to a track frame be provided at the outer end of the leg.

In this case, the joint surfaces of the joint flange section at the inner end of each leg and the central frame section and/or the joint surface of the joint flange section at the outer end of each leg and the track frame are preferably flat faces.

With this arrangement, machining of welded surfaces can be significantly facilitated and high-accuracy and high-strength welded surfaces can be achieved in spite of easy welding.

By making the joint surfaces of each leg and the central frame section and the joint surfaces of each leg and the track frame flat, or by making either of them flat, reasonable effects can be achieved.

In the invention, it is preferable to form each leg so as to be gently widened from its inner end to its outer end.

With this arrangement, the stress imposed on the track frame side of each leg where a great amount of internal stress (e.g., bending stress and shearing stress) caused by the load of the upper revolving superstructure or the like working on the center frame is exerted can be substantially equalized to the stress imposed on the central frame section side of the leg. As a result, the weight of the center frame can be reduced compared to the conventional center frames made of sheet metal whose thickness is determined depending on the greatest stress imposed thereon.

At the end of each leg which joins to the track frame is provided with the joint flange section. This joint flange section is formed at the distal end of the gently widened portion of the leg so that the joint flange section has large area and the strength of welding established between the leg and the track frame can be increased.

BEST MODE FOR CARRYING OUT THE INVENTION

Referring now to the accompanying drawings, crawler frames for a construction machine will be described according to preferred embodiments of the invention.

First, reference is made to FIGS. 1 to 5 to explain a crawler frame for a construction machine according to a first embodiment of the invention.

Figure 1:
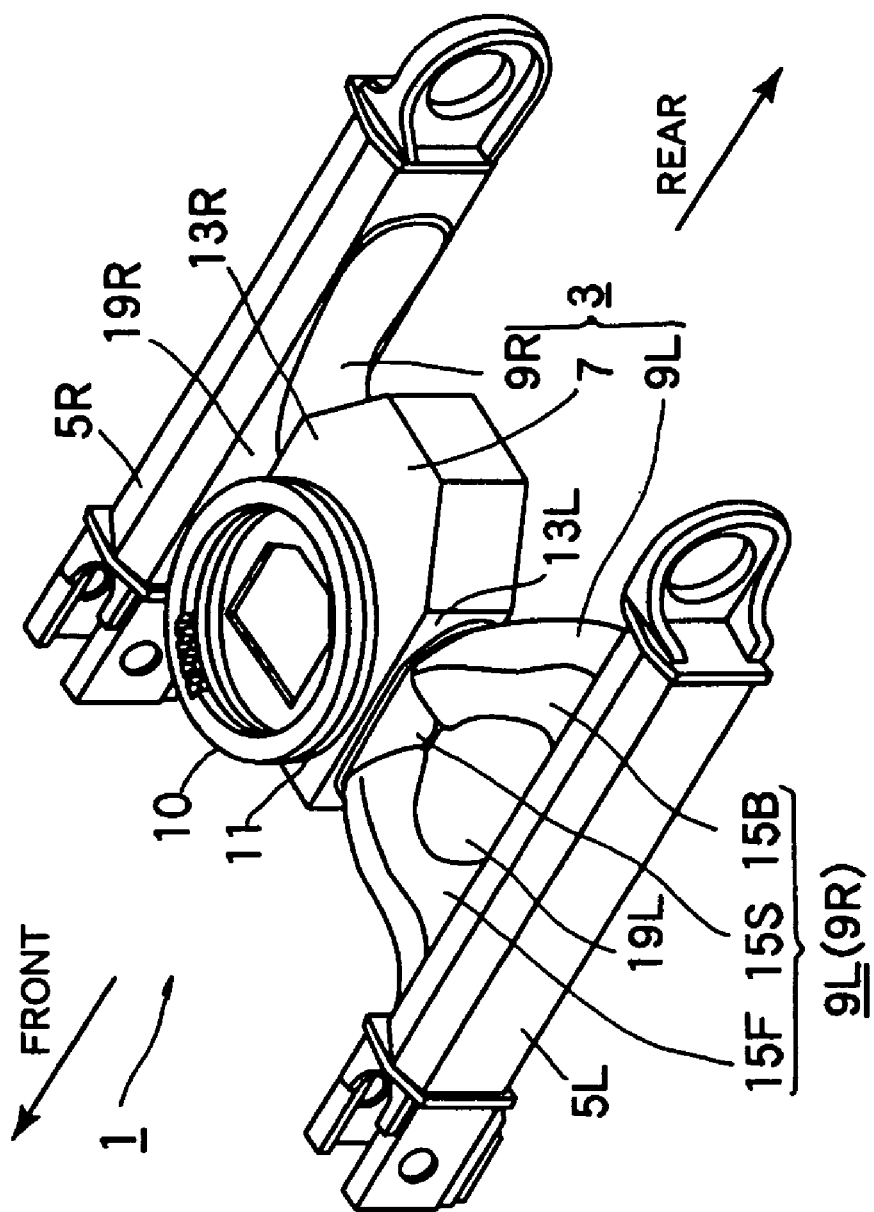
FIG. 1 is an outside perspective view of a crawler frame for a construction machine according to a first embodiment of the invention.
Figure 2:
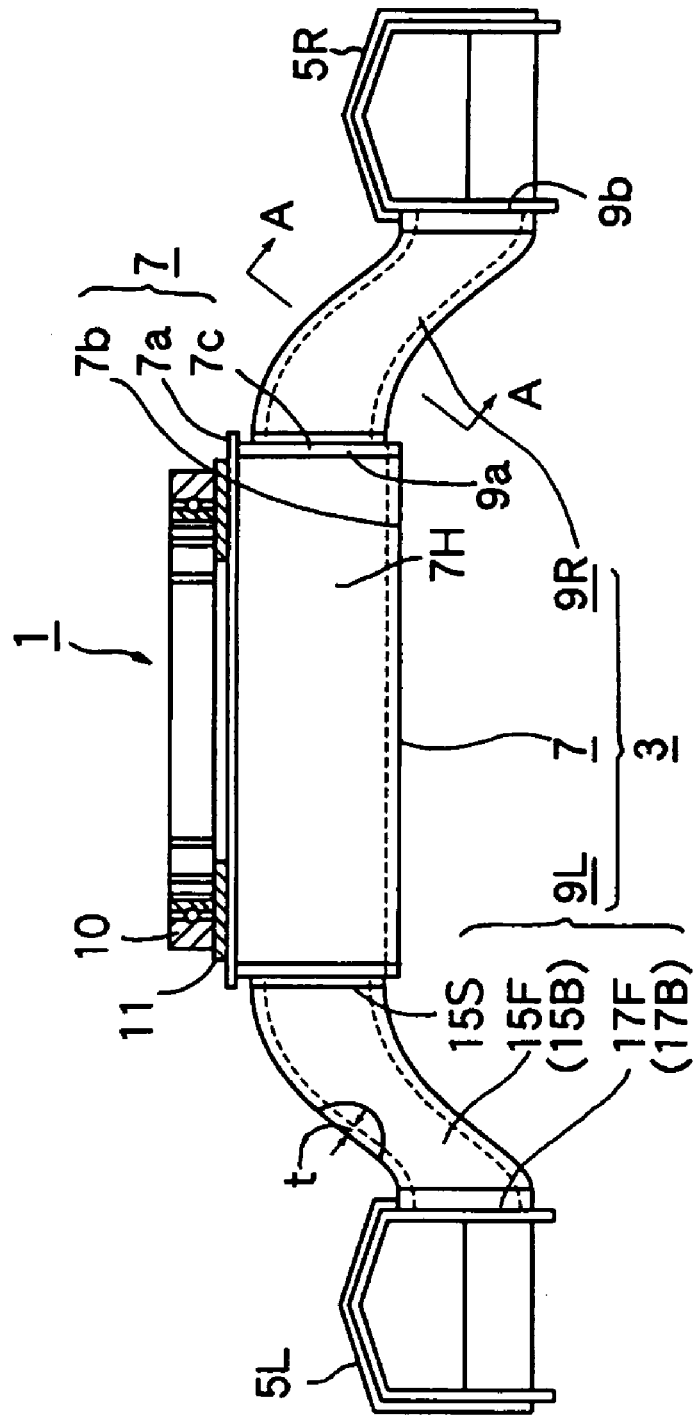
FIG. 2 is a front view of the crawler frame for a construction machine according to the first embodiment of the invention.
Figure 3:
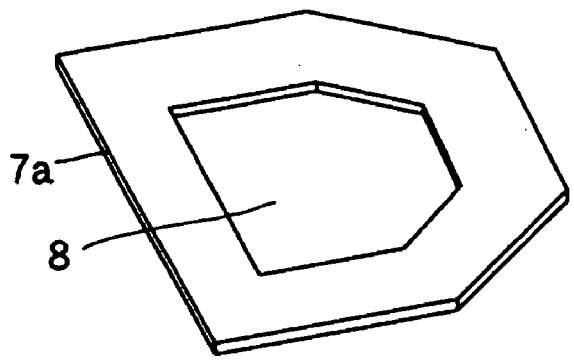
FIG. 3 is exploded views of a central frame section of a center frame provided for the crawler frame for a construction machine of the first embodiment of the invention.
Figure 3:
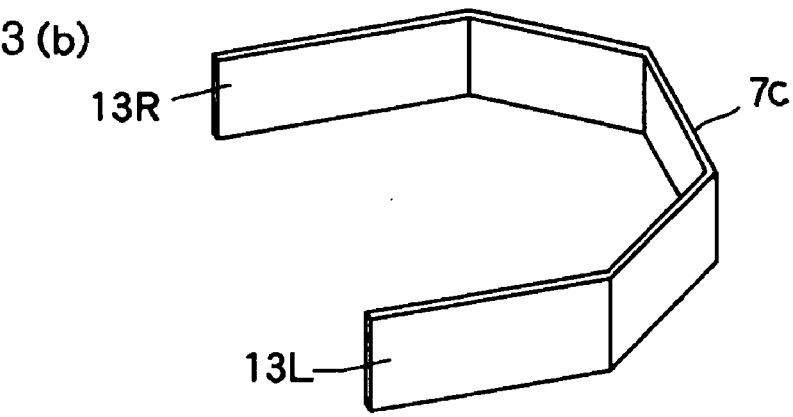
Figure 3:
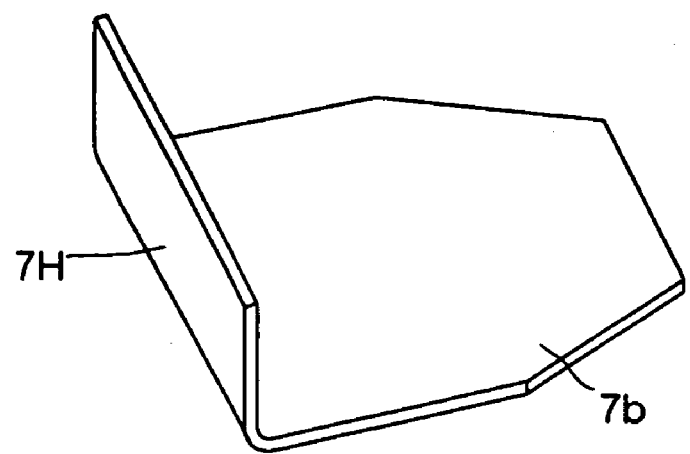
Figure 4:
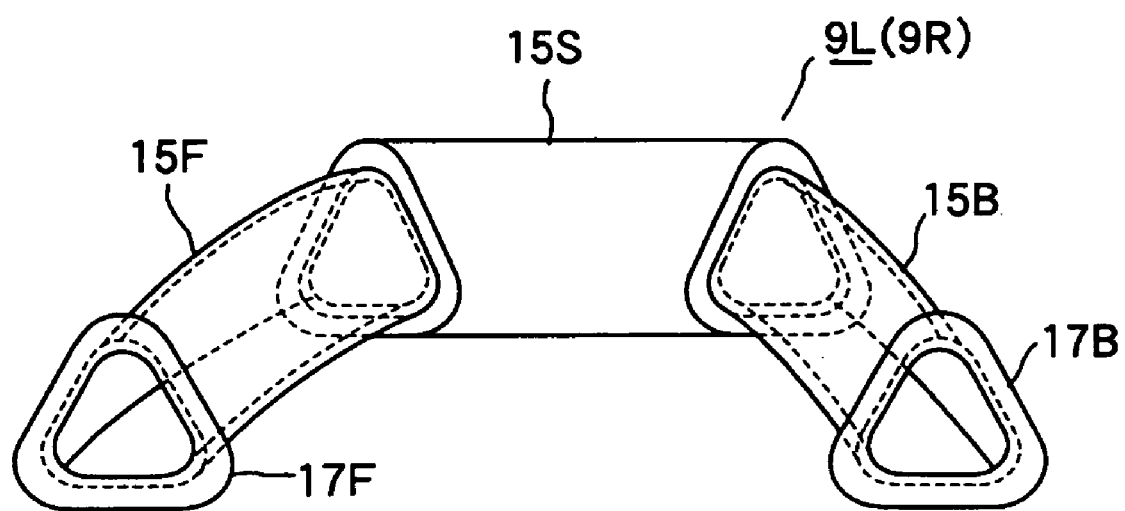
FIG. 4 is an outside side view of a leg of the center frame provided for the crawler frame for a construction machine of the first embodiment of the invention.
Figure 5:
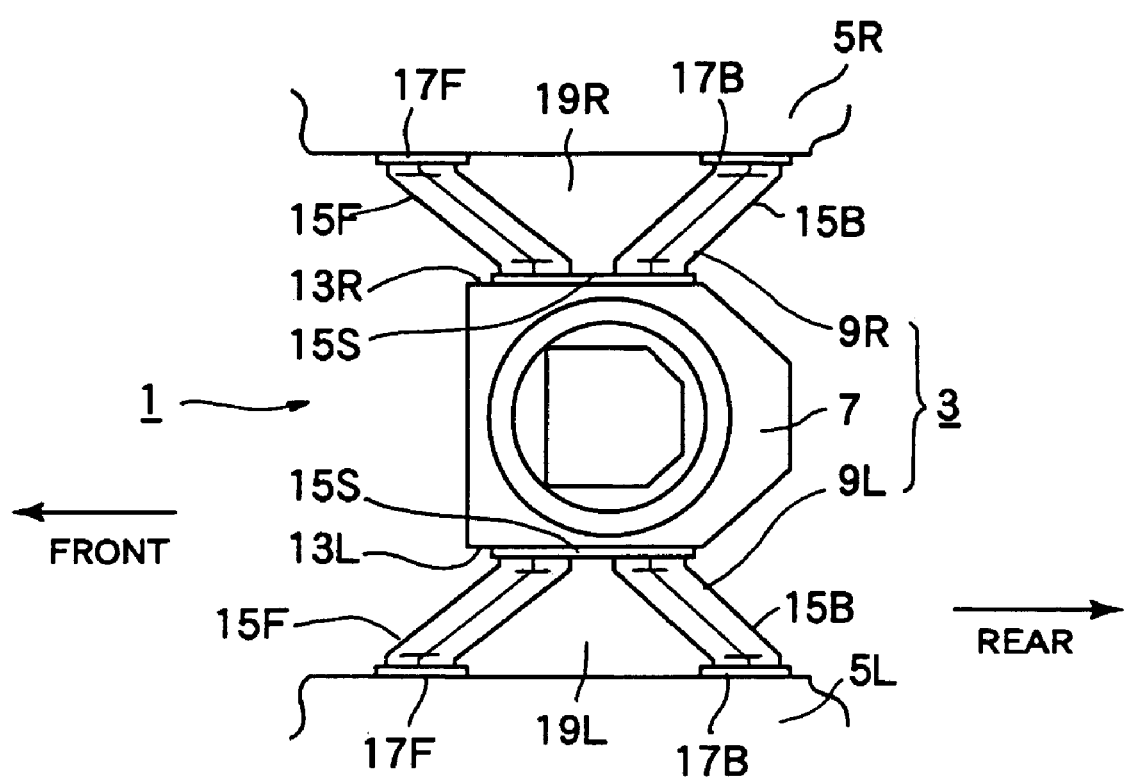
FIG. 5 is a diagrammatical plan view of the crawler frame for a construction machine according to the first embodiment of the invention.

FIG. 1 is an outside perspective view of the crawler frame for a construction machine according to the first embodiment of the invention. FIG. 2 is a front view of the crawler frame for a construction machine according to the first embodiment of the invention. FIGS. 3(*a*), 3(*b*), 3(*c*) are exploded views of a central frame section of a center frame provided for the crawler frame for a construction machine of the first embodiment of the invention. FIG. 4 is an outside side view of a leg of the center frame provided for the crawler frame for a construction machine of the first embodiment of the invention. FIG. 5 is a diagrammatical plan view of the crawler frame for a construction machine according to the first embodiment of the invention.

In FIGS. 1, 2, a crawler frame 1 is used for a turnable material handling vehicle such as a hydraulic excavator and incorporated in a crawler travel system having right and left rotatable crawlers (caterpillars).

In the following description, the traveling direction of the turnable material handling vehicle such as a hydraulic excavator is referred to as "back and forth direction (the longitudinal direction of the track frames 5R, 5L) and the lateral direction orthogonal to the back and forth direction is referred to as "sideways direction (the direction orthogonal to the longitudinal direction of the track frames 5R, 5L).

In this embodiment, the crawler frame 1 is comprised of a center frame 3 and track frames 5 (5R, 5L) which are located at the right and left of the center frame 3 respectively.

The center frame 3 is comprised of a central frame section 7 and a right leg 9R and a left leg 9L which are formed from cast steel and secured to the right and left side vertical face plates, respectively, of the central frame section 7.

The central frame section 7 is formed from a material such as a steel plate and constituted by an upper member 7*a*, a lower member 7*b* and a vertical member 7*c* for connecting the upper and lower members 7*a*, 7*b* as shown in FIG. 3.

The outer shape of the upper member 7*a* is hexagonal. Defined within the upper member 7*a* is a hexagonal aperture 8 into which swivel joints or pipes (not shown) are inserted. The vertical member 7*c* is formed by bending a relatively long sheet material such as a steel plate into the shape of a hexagonal prism from which one vertical face plate is eliminated. By bending a sheet in this way, a left side vertical face plate 13L parallel to the left track frame 5L is formed at the left end and a right side vertical face plate 13R parallel to the right track frame 5R is formed at the right end.

The lower member 7*b* is formed into a hexagonal shape and the end portion corresponding to the bottom of the hexagon is bent thereby to form a front side vertical face plate 7H having the same height as the right and left side vertical face plates 13R, 13L of the vertical member 7*c*. The upper end of the front side vertical face plate 7H is brought into contact with the underside of the upper member 7*a* for welding.

The upper member 7*a*, the lower member 7*b* and the vertical member 7*c* are integrated by welding, thereby forming a hollow box of hexagonal-prismatic shape.

Figure 8:
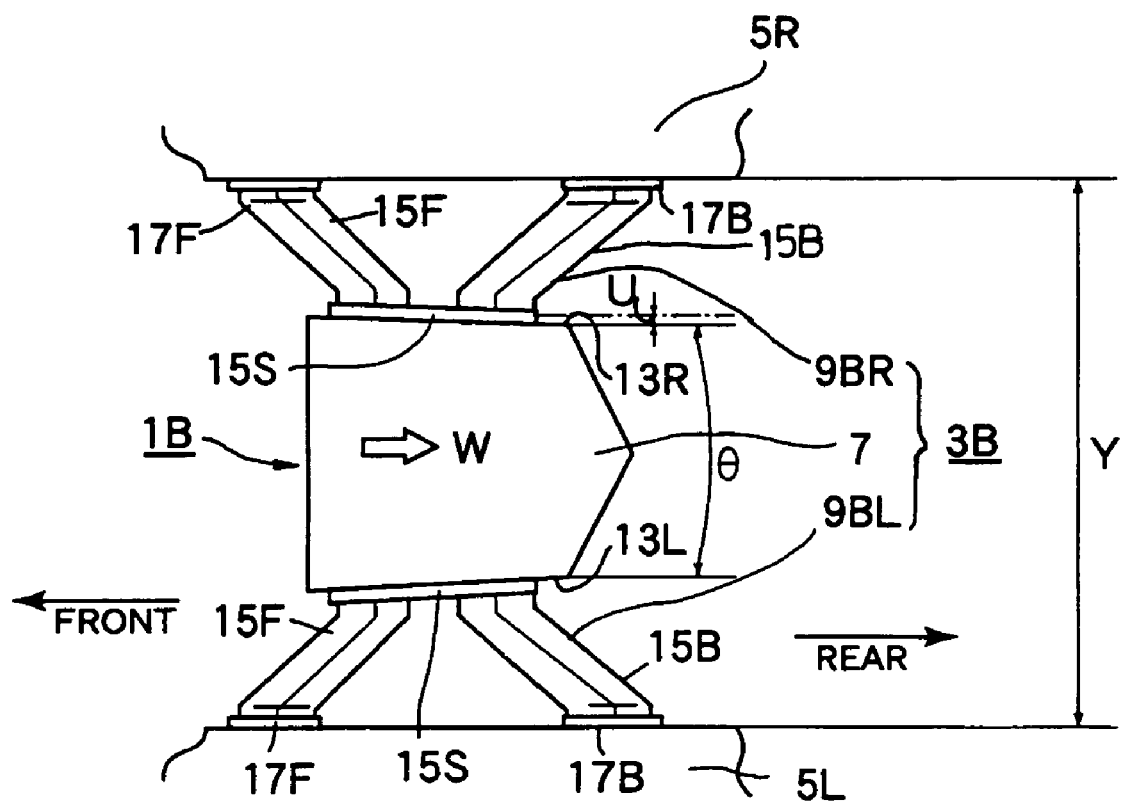
FIG. 8 is a diagrammatical plan view of a crawler frame for a construction machine according to a third embodiment of the invention.

Although the outer shape of the upper member 7*a* shown in FIG. 3 is hexagonal, the central frame section 7 may be made by forming the upper member 7*a* into a pentagonal shape as shown in FIG. 8 (described later) and forming the lower member 7*b* and the vertical member 7*c* so as to fit the pentagonal upper member 7*a*.

Secured to the top face of the upper member 7*a* of the central frame section 7 is a fixing bed plate 11 for fixing a swing bearing with a ring gear 10 placed thereon.

The right and left side vertical face plates 13R, 13L of the vertical member 7*c* are constituted by flat faces parallel to the inner side wall faces of the right and left track frames 5R, 5L, respectively. The right leg 9R formed from cast steel and the left leg 9L formed from case steel are secured to the right and left side vertical face plates 13R, 13L respectively, by welding.

The central frame section 7 and the fixing bed plate 11 may be integrally formed from cast steel.

Referring to FIGS. 1, 2 and 4, the left leg 9L formed from cast steel has, at its inner end, a joint flange section 15S securely welded to the left side vertical face plate 13L of the central frame section 7. A front leg section 15F and rear leg section 15B of the left leg 9L extend outwardly from the joint flange section 15S to the left track frame 5L positioned at the lower left. The front and rear leg sections 15F, 15B have, at their outer ends, joint flange sections 17F, 17B respectively. The joint flange sections 17F, 17B are joined and secured by welding to the inner side wall face of the left track frame 5L.

Similarly, the right leg 9R formed from cast steel has, at its inner end, a joint flange section 15S secured by welding to the right side vertical face plate 13R of the central frame section 7. A front leg section 15F and rear leg section 15B of the right leg 9R extend outwardly from the joint flange section 15S to the right track frame 5R positioned at the lower right. The front and rear leg sections 15F, 15B have, at their outer ends, joint flange sections 17F, 17B respectively. The joint flange sections 17F, 17B are joined and secured by welding to the inner side wall face of the right track frame 5R.

As shown in FIG. 4, the front leg sections 15F and rear leg sections 15B of the right and left legs 9R, 9L are formed in the shape of a triangular prism and have a top face of convex cross-section and a wall thickness t (see FIG. 2).

The joint surfaces 9*a* of the joint flange sections 15S, which are positioned at the inner ends of the right and left legs 9R, 9L respectively and secured by welding to the right and left side vertical face plates 13R, 13L of the central frame section 7, may be a flat face respectively. The joint surfaces 9*b* of the joint flange sections 17F, 17B, which are positioned at the outer ends of the right and left legs 9R, 9L and secured by welding to the inner side wall faces of the right and left track frames 5R, 5L, may be a flat face respectively.

As shown in FIG. 5, the joint flange section 15S at the inner end of the left leg 9L formed from cast steel is secured by welding to the left side vertical face plate 13L of the central frame section 7. The front leg section 15F and rear leg section 15B of the left leg 9L extend from the joint flange section 15S outwardly to the left track frame 5L located at the lower left, gradually downwardly inclining in an arc. The joint flange sections 17F, 17B at the outer ends of the front leg section 15F and rear leg section 15B of the left leg 9L are joined and secured by welding to the inner side wall face of the left track frame 5L. Accordingly, a relatively large left aperture 19L is defined by the front leg section 15F and rear leg section 15B of the left leg 9L and the left track frame 5L.

The joint flange section 15S at the inner end of the right leg 9R formed from cast steel is secured by welding to the right side vertical face plate 13R of the central frame section 7. The front leg section 15F and rear leg section 15B of the right leg 9R extend from the joint flange section 15S outwardly to the right track frame 5R located at the lower right, gradually downwardly inclining in an arc. The joint flange sections 17F, 17B at the outer ends of the front leg section 15F and rear leg section 15B of the right leg 9R are joined and secured by welding to the inner side wall face of the right track frame 5R. Accordingly, a relatively large right aperture 19R is defined by the front leg section 15F and rear leg section 15B of the right leg 9R and the right track frame 5R.

As shown in FIG. 5, the center frame 3 has a substantially X shape owing to the right and left legs 9R, 9L formed from cast steel. More specifically, the joint flange sections 17F at the outer ends of the front leg sections 15F of the right and left legs 9R, 9L formed from cast steel are respectively located at a more forward position, whereas the joint flange sections 17B at the outer ends of the rear leg sections 15B of the right and left legs 9R, 9L are respectively located at a more rearward position, and the front and rear leg sections of each leg are farther away from each other at their leading ends, so that the center frame 3 is formed in a substantially X shape which is suitable for sustaining the heavy load of the upper revolving superstructure etc. imposed on the central frame section 7.

In the above explanation, there has been described a case where the front and rear leg sections 15F, 15B of the right and left legs 9R, 9L formed from cast steel extend from their associated joint flange section 15S outwardly to the right or left track frame 5R or 5L located at the lower right or lower left, gradually downwardly inclining in an arc, and the joint flange sections 17F, 17B at the outer ends are secured by welding to the inner side wall face of the right or left track frame 5R or 5L. An alternative is such that the front and rear leg sections 15F, 15B extend to the right or left track frame 5R or 5L, gradually downwardly inclining in linear form, and the joint flange sections 17F, 17B at the outer ends are joined to and secured by welding to the inner side wall face of the right or left track frame 5R or 5L.

With reference to FIGS. 6(a) to 6(e), there will be explained the sectional form of the legs of the center frame provided for the crawler frame for a construction machine of the embodiments of the invention.

Figure 6:
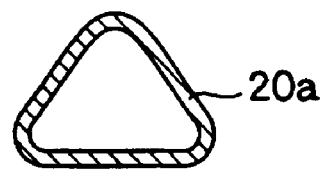
FIGS. 6(*a*) to 6(*e*) are sectionals views of various legs according to embodiments of the invention.
Figure 6:
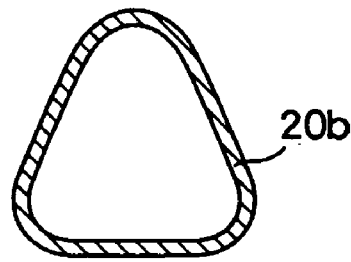
Figure 6:
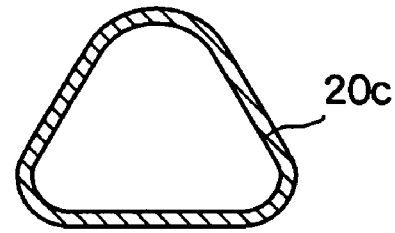
Figure 6:
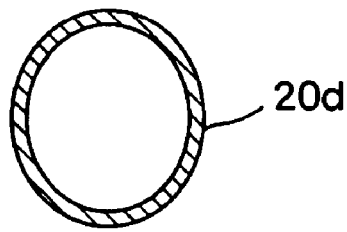
Figure 6:
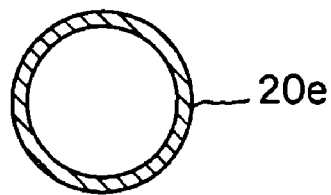

In order to prevent mud from adhering to and depositing on the crawler frame for a construction machine, it is necessary to contemplate what sectional form is suited for the legs which are formed from cast steel and provided for the center frame of the crawler frame for a construction machine. FIGS. 6(a) to 6(c) show sectional forms for a tubular leg having a top face of convex cross-section, whereas FIGS. 6(d) and 6(e) show circular and oval sectional forms for a cylindrical pipe-like leg. These sectional forms are intended for prevention of adhesion/deposition of mud on the top faces of the legs. It should be noted that FIGS. 6(a) to 6(e) are sectional views taken along line A—A of FIG. 2.

FIG. 6(a) shows the sectional form 20a of a tubular leg having a top face of convex cross-section and this sectional form 20a is substantially triangular; FIG. 6(b) shows the sectional form 20b of a tubular leg having a top face of convex cross-section and this sectional form 20b is in the shape of a relatively high isosceles-triangle; FIG. 6(c) shows the sectional form 20c of a tubular leg having a top face of convex cross-section and this sectional form 20c is in the shape of a relatively low isosceles-triangle; FIG. 6(d) shows the sectional form 20d of a tubular leg having a top face of convex cross-section and this sectional form 20d is oval; and FIG. 6(e) shows the sectional form 20e of a cylindrical pipe-like leg and this sectional form 20e is circular. It should be noted that the top face of any of these legs has a convex cross-section.

In the case of the cylindrical pipe-like leg 20e shown in FIG. 6(e), even if mud flies onto or penetrates to the top face of the leg, adhering to the top face, the mud is unlikely to accumulate and gradually drops onto the ground thanks to the cylindrical pipe-like shape of the leg with the round top face. In view of the effect of preventing adhesion/deposition of mud, the leg 20e shown in FIG. 6(e) is somewhat inferior to the legs shown in FIGS. 6(a) to 6(d), but it is true that mud is unlikely to adhere to and deposit on the leg shown in FIG. 6(e) to the substantially same degree as those of the legs shown in FIGS. 6(a) to 6(d). In addition, since the leg shown in FIG. 6(e) is in the shape of a cylindrical pipe having a circular cross-section, even if mud adheres to and deposits on it, the amount of it is negligible. Further, the leg shown in FIG. 6(e) is easy to manufacture because it is formed in the shape 20e of a cylindrical pipe having a circular cross-section.

While FIGS. 6(a) to 6(d) show three tubular legs of triangular cross-section and one tubular leg of oval cross-section as examples of the sectional form of the legs formed from cast steel, there are other examples of tubular forms with a top face of convex cross-section. For example, pentagonal prismatic and hexagonal prismatic shapes may be employed. In the cases of tubular legs of triangular, pentagonal and hexagonal cross-section, the inner face and outer face of the leg should be rounded at the angled parts in order to avoid stress concentration.

Figure 7:
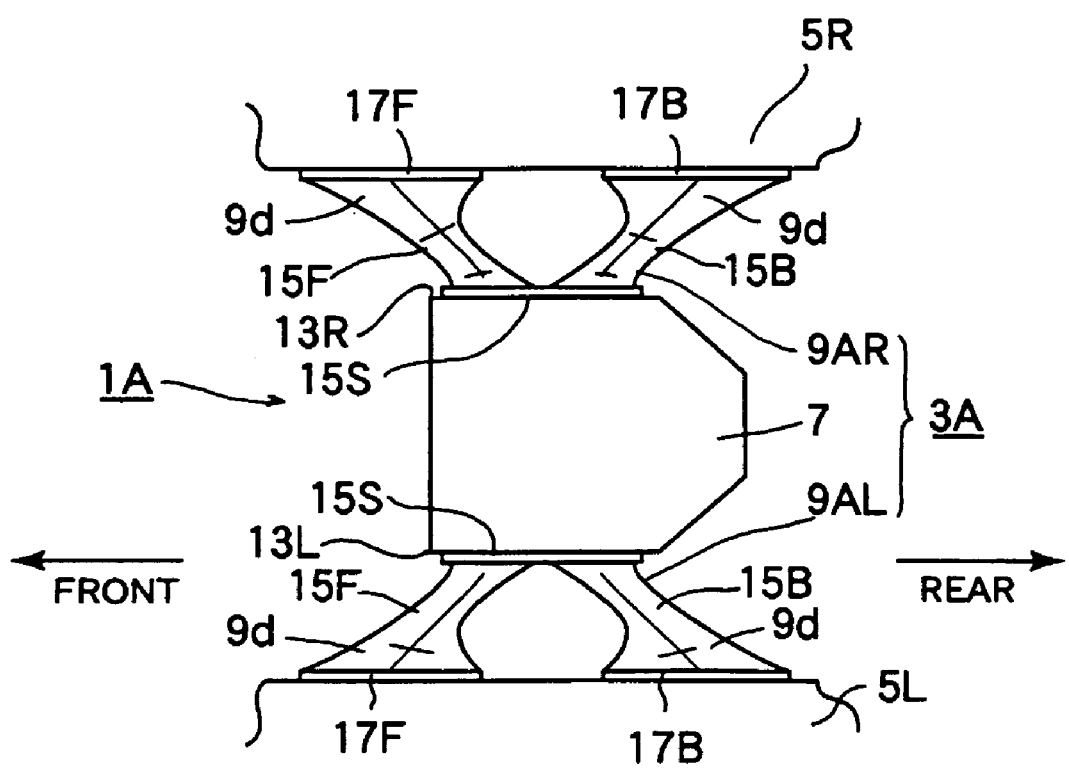
FIG. 7 is a diagrammatical plan view of a crawler frame for a construction machine according to a second embodiment of the invention.

Next, reference is made to FIG. 7 to describe a crawler frame for a construction machine according to a second embodiment of the invention. FIG. 7 is a diagrammatical plan view of the crawler frame for a construction machine according to the second embodiment of the invention. In this embodiment, the parts similar to those of the foregoing embodiment are designated by the same reference numerals as in the foregoing embodiment and a detailed description of those parts is omitted (the same applies to other embodiments described below).

In the second embodiment, a crawler frame 1A has a center frame 3A and the track frames 5 (5L, 5R) disposed at the right and left of the center frame 3A.

The center frame 3A includes the central frame section 7 and a right leg 9AR and left leg 9AL which are formed from cast steel and secured to the right and left side vertical face plates, respectively, of the central frame section 7.

Mounted on the fixing bed plate 11 of the central frame section 7 is the swing bearing with a ring gear 10.

Secured to the left side vertical face plate 13L of the central frame section 7 by welding is the joint flange section 15S provided at the inner end of the left leg 9AL formed from cast steel. The front leg section 15F and rear leg section 15B of the left leg 9AL extend from the joint flange section 15S outwardly toward the left track frame 5L located at the lower left, gradually downwardly inclining in an arc. The joint flange sections 17F, 17B provided at the outer ends of the front and rear leg sections 15F, 15B of the left leg 9AL are joined to and secured by welding to the inner side wall face of the left track frame 5L.

Secured to the right side vertical face plate 13R of the central frame section 7 by welding is the joint flange section 15S provided at the inner end of the right leg 9AR formed from cast steel. The front leg section 15F and rear leg section 15B of the right leg 9AR extend from the joint flange section 15S outwardly toward the right track frame 5R located at the lower right, gradually downwardly inclining in an arc. The joint flange sections 17F, 17B provided at the outer ends of the front and rear leg sections 15F, 15B of the right leg 9AR are joined to and secured by welding to the inner side wall face of the right track frame 5R.

In this way, the front leg section 15F and rear leg section 15B of the left leg 9AL are respectively gradually widened toward their respective ends, forming a tapered shape 9d. Formed at the ends of the front and rear leg sections 15F, 15B having the gentle tapered shape 9d are the joint flange sections 17F, 17B.

With this arrangement, when securing the joint flange sections 17F, 17B provided at the outer ends of the front and rear leg sections 15F, 15B of the left leg 9AL to the inner side wall face of the left track frame 5L by welding, larger weld area can be ensured for the joint flange sections 17F, 17B so that the strength of welding established between the leg and the track frame can be increased.

Similarly, the front leg section 15F and rear leg section 15B of the right leg 9AR are respectively gradually widened toward their respective ends, forming a tapered shape 9d. Formed at the ends of the front and rear leg sections 15F, 15B having the gentle tapered shape 9d are the joint flange sections 17F, 17B.

With this arrangement, when securing the joint flange sections 17F, 17B provided at the outer ends of the front and rear leg sections 15F, 15B of the right leg 9AR to the inner side wall face of the right track frame 5R by welding, larger weld area can be ensured for the joint flange sections 17F, 17B so that the strength of welding established between the leg and the track frame can be increased.

By gradually widening and curving the front and rear leg sections 15F, 15B of the right and left legs 9AR, 9AL towards their respective ends, larger weld area can be ensured for the joint flange sections 17F, 17B and stress concentration on the widened portions of the front and rear leg sections 15F, 15B of the right and left legs 9AR, 9AL can be prevented.

In view of the concept of the technique of the invention, the crawler frame 1A shown in FIG. 7 inevitably assumes X form.

Next, reference is made to FIG. 8 to describe a crawler frame for a construction machine according to a third embodiment of the invention. FIG. 8 is a diagrammatical plan view of the crawler frame for a construction machine according to the third embodiment of the invention.

In the third embodiment, a crawler frame 1B has a center frame 3B and the track frames 5 (5R, 5L) disposed at the right and left sides of the center frame 3B.

The center frame 3B includes a central frame section 7A and a right leg 9BR and left leg 9BL which are formed from cast steel and secured to the right and left side vertical face plates of the central frame section 7A.

Mounted on the fixing bed plate 11 of the central frame section 7A is the swing bearing with a ring gear 10.

The central frame section 7A shown in FIG. 8 is pentagonal in shape. Its manufacturing method is the same as the first embodiment shown in FIG. 3 except that the upper member 7a has a pentagonal shape instead of a hexagonal shape.

The width (the length in the lateral direction) of the central frame section 7A is greater in the front part than in the rear part when viewed in the traveling direction. More specifically, the planes of the right and left side vertical face plates 13R, 13L of the central frame section 7A inwardly incline at an angle of θ/2 from the front side toward the rear side so that the central frame 7A is tapered down with the width (the length in the lateral direction) of the front side being greater than that of the rear side.

Secured, by welding, to the left side vertical face plate 13L of the central frame section 7A which inclines at an angle of θ/2 is the joint flange section 15S provided at the inner end of the left leg 9BL formed from cast steel. The front leg section 15F and rear leg section 15B of the left leg 9BL extend from the joint flange section 15S outwardly toward the left track frame 5L located at the lower left, gradually downwardly inclining in an arc. The joint flange sections 17F, 17B provided at the outer ends of the front and rear leg sections 15F, 15B of the left leg 9BL are joined to and secured by welding to the inner side wall face of the left track frame 5L.

Secured, by welding, to the right side vertical face plate 13R of the central frame section 7A which inclines at an angle of θ/2 is the joint flange section 15S provided at the inner end of the right leg 9BR formed from cast steel. The front leg section 15F and rear leg section 15B of the right leg 9BR extend from the joint flange section 15S outwardly toward the right track frame 5R located at the lower right, gradually downwardly inclining in an arc. The joint flange sections 17F, 17B located at the outer ends of the front and rear leg sections 15F, 15B of the right leg 9BR are joined to and secured by welding to the inner side wall face of the right track frame 5R.

The right and left track frames 5R, 5L are aligned in a direction orthogonal to the sideways direction of the construction machine and disposed in parallel with each other at a specified distance apart.

The joint flange sections 17F, 17B disposed at the outer ends of the front leg section 15F and rear leg section 15B of the left leg 9BL are formed in parallel with the left track frame 5L and the joint flange sections 17F, 17B disposed at the outer ends of the front leg section 15F and rear leg section 15B of the right leg 9BR are formed in parallel with the right track frame 5R.

Thus, the central frame section 7A is wide at its front side and narrow at its rear side; the planes of the right and left side vertical face plate 13R, 13L of the central frame section 7A incline at an angle of θ/2 from the front side toward the rear side; and the joint flange sections 15S disposed at the inner ends of the right and left legs 9BR, 9BL are secured by welding to the inclining faces of the right and left side vertical face plates 13R, 13L, respectively, of the central frame section 7A, whereby various stresses imposed on the central frame section 7A by the heavy load of the upper revolving superstructure etc. can be steadily sustained.

For coupling the central frame section 7A to the right and left track frames 5R, 5L through the joint flange sections 17F, 17B disposed at the outer ends of the right and left legs 9BR, 9BL, the joint flange sections 17F, 17B at the outer ends of the right and left legs 9BR, 9BL are first welded to the flat inner side wall faces of the right and left track frames beforehand, and then, the right and left legs 9BR, 9BL are interposed between the central frame section 7A and the track frames such that the spacing between the right and left legs 9BR, 9BL is kept to a specified value Y, and the central frame section 7A is pushed in the direction W shown in FIG. 8.

With this arrangement, the clearance U between the central frame section 7A and the right and left legs 9BR, 9BL can be made to be zero so that not only welding can be easily carried out but also weld strength can be ensured and, in addition, the number of welding processes can be reduced.

Although the central frame section 7A of the center frame 3B is pentagonal in shape in FIG. 8, it may have a hexagonal shape.

As far as the right and left side vertical face plates 13R, 13L of the pentagonal or hexagonal central frame section 7A are flat faces, other sides may be curved.

Figure 9:
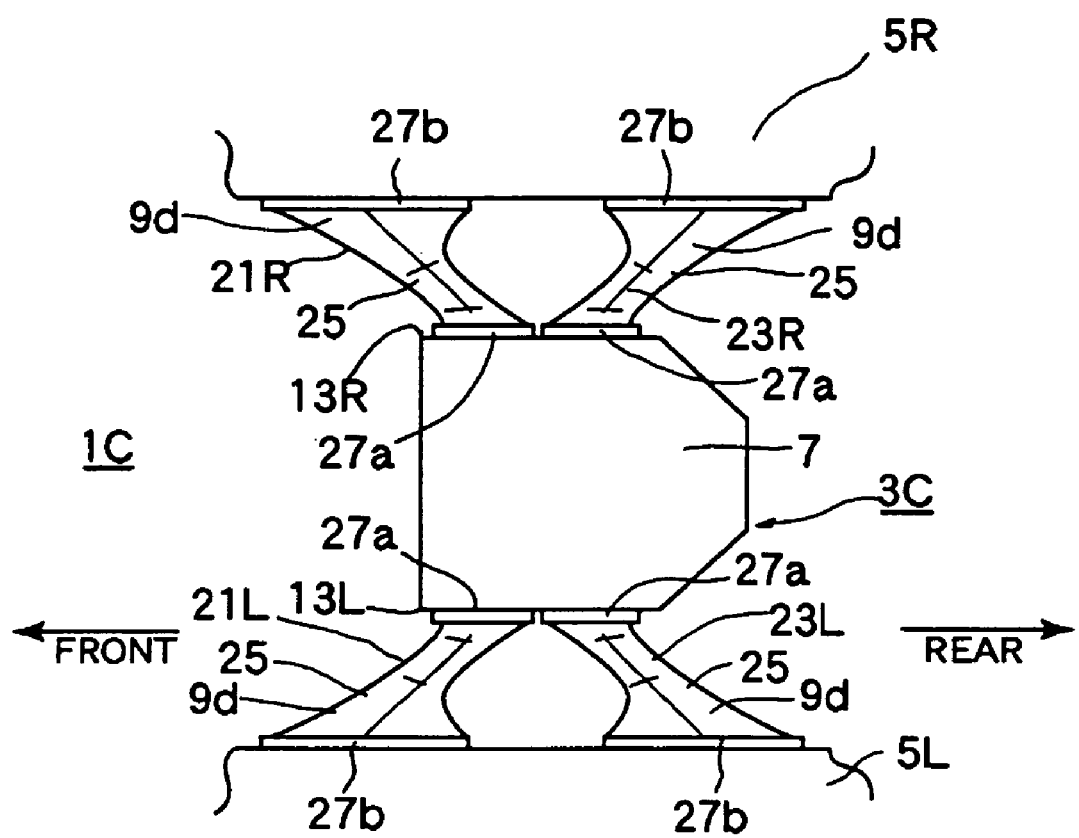
FIG. 9 is a diagrammatical plan view of a crawler frame for a construction machine according to a fourth embodiment of the invention.

Next, reference is made to FIG. 9 to describe a crawler frame for a construction machine according to a fourth embodiment of the invention. FIG. 9 is a diagrammatical plan view of the crawler frame for a construction machine according to the fourth embodiment of the invention.

In the fourth embodiment, a crawler frame 1C has a center frame 3C and the track frames 5 (5R, 5L) disposed at the right and left sides of the center frame 3C.

The center frame 3C includes the central frame section 7 and a front right leg 21R, a rear right leg 23R, a front left leg 21L and a rear left leg 23L which are formed from cast steel and secured to the right and left side vertical face plates of the central frame section 7.

Mounted on the fixing bed plate 11 of the central frame section 7 is the swing bearing with a ring gear 10.

Secured, by welding, to the left side vertical face plate 13L of the central frame section 7 are joint flange sections 27a provided at the inner ends of the front and rear left legs 21L, 23L formed from cast steel. A leg section 25 constituting the front left leg 21L and a leg section 25 constituting the rear left leg 23L extend from their associated joint flange sections 27a outwardly toward the left track frame 5L located at the lower left, gradually downwardly inclining in an arc. Joint flange sections 27b provided at the outer ends of the leg sections 25 of the front left leg 21L and the rear left leg 23L are joined to and secured by welding to the inner side wall face of the left track frame 5L.

Secured, by welding, to the right side vertical face plate 13R of the central frame section 7 are joint flange sections 27a provided at the inner ends of the front and rear right legs 21R, 23R formed from cast steel. A leg section 25 constituting the front right leg 21R and a leg section 25 constituting the rear right leg 23R extend from their associated joint flange sections 27a outwardly toward the right track frame 5R located at the lower right, gradually downwardly inclining in an arc. Joint flange sections 27b disposed at the outer ends of the front right leg 21R and the rear right leg 23R are joined to and secured by welding to the inner side wall face of the right track frame 5R.

As described earlier, the front right leg 21R, rear right leg 23R, front left leg 21L and rear left leg 23L formed from cast steel have, at their respective inner ends, the joint flange sections 27a which are joined to and securely welded to the right and left side vertical face plates 13R, 13L of the central frame section 7, and the leg sections 25 of these legs have, at their outer ends, joint flange sections 27b which are joined to and secured by welding to the inner side wall faces of the right and left track frames.

In the crawler frame 1C of the fourth embodiment, the central frame section 7 is supported on and coupled to the right and left track frames 5R, 5L by means of four legs formed from cast steel, that is, the front right leg 21R, the rear right leg 23R, the front left leg 21L, and the rear left leg 23L.

Thus, the leg sections 25 of the front left leg 21L and the rear left leg 23L are gradually widened to their respective ends, forming a tapered shape 9d. Formed at the ends of the leg sections 25 of the front left leg 21L and the rear left leg 23L having the gentle tapered shape 9d are the joint flange sections 27b.

With this arrangement, when securing the joint flange sections 27b provided at the outer ends of the front and rear left legs 21L, 23L to the inner side wall face of the left track frame 5L by welding, larger weld area can be ensured for the joint flange sections 27b so that the strength of welding established between the legs and the track frame can be increased.

Similarly, the leg sections 25 of the front right leg 21R and the rear right leg 23R are gradually widened to their respective ends, forming a tapered shape 9d. Formed at the ends of the leg sections 25 of the front right leg 21R and the rear right leg 23R having the gentle tapered shape 9d are the joint flange sections 27b.

With this arrangement, when securing the joint flange sections 27b at the outer ends of the front and rear right legs 21R, 23R to the inner side wall face of the right track frame 5R by welding, larger weld area can be ensured for the joint flange sections 27b so that the strength of welding established between the legs and the track frame can be increased.

By gradually widening and curving the leg sections 25 of the front and rear right legs 21R, 23R and the front and rear left legs 21L, 23L towards their respective ends, larger weld area can be ensured for the joint flange sections 27b and the concentration of stress on the leg sections 25 of the front and rear right legs 21R, 23R and the front and rear left legs 21L, 23L can be prevented.

In view of the concept of the technique of the invention, the crawler frame 1C shown in FIG. 9 inevitably assumes the form of X.

Figure 10:
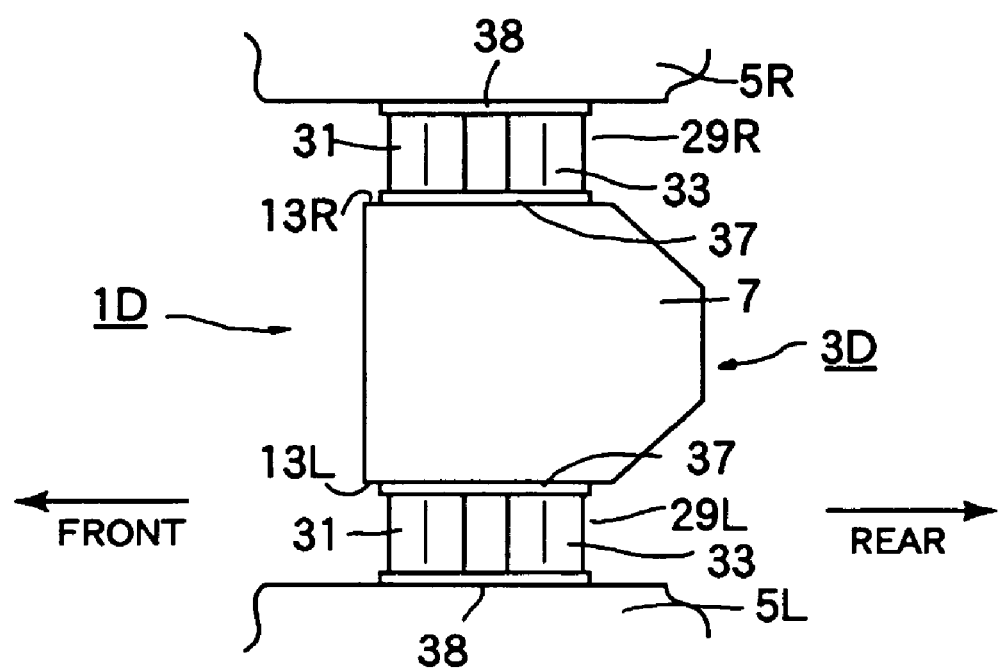
FIG. 10 is a diagrammatical plan view of a crawler frame for a construction machine according to a fifth embodiment of the invention.

Next, reference is made to FIG. 10 to describe a crawler frame for a construction machine according to a fifth embodiment of the invention. FIG. 10 is a diagrammatical plan view of the crawler frame for a construction machine according to the fifth embodiment of the invention.

In the fifth embodiment, a crawler frame 1D has a center frame 3D and the track frames 5 (5R, 5L) disposed at the right and left sides of the center frame 3D.

The center frame 3D includes the central frame section 7 and a right leg 29R and left leg 29L which are formed from cast steel and secured to the right and left side vertical face plates of the central frame section 7.

Mounted on the fixing bed plate 11 of the central frame section 7 is the swing bearing with a ring gear 10.

Secured, by welding, to the left side vertical face plate 13L of the central frame section 7 is a joint flange section 37 which is provided at the inner end of the left leg 29L formed from cast steel. A front leg section 31 and rear leg section 33 of the left leg 29L extend from the joint flange section 37 outwardly toward the left track frame 5L located at the lower left, gradually downwardly inclining in an arc. An integral joint flange section 38 provided at the outer ends of the front leg section 31 and rear leg section 33 of the left leg 29L is joined to and secured by welding to the inner side wall face of the left track frame 5L.

Secured, by welding, to the right side vertical face plate 13R of the central frame section 7 is a joint flange section 37 which is provided at the inner end of the right leg 29R formed from cast steel. A front leg section 31 and rear leg section 33 of the right leg 29R extend from the joint flange section 37 outwardly toward the right track frame 5R located at the lower right, gradually downwardly inclining in an arc. An integral joint flange section 38 provided at the outer ends of the front leg section 31 and rear leg section 33 of the right leg 29R is joined to and secured by welding to the inner side wall face of the right track frame 5R.

The joint flange section 37 provided at the inner ends of the front and rear leg sections 31, 33 of the right leg 29R formed from cast steel and secured by welding to the right side vertical face plate 13R is integral. The joint flange section 37 provided at the inner ends of the front and rear leg sections 31, 33 of the left leg 29L formed from cast steel and secured by welding to the left side vertical face plate 13L is integral. The joint flange section 38 provided at the outer ends of the front and rear leg sections 31, 33 of the right leg 29R and secured by welding to the inner side wall face of the right track frame 5R is integral. The joint flange section 38 provided at the outer ends of the front and rear leg sections 31, 33 of the left leg 29L and secured by welding to the inner side wall face of the left track frame 5L is integral.

Although the crawler frame 1D for a construction machine according to the fifth embodiment shown in FIG. 10 assumes the shape of H, it may be formed in the shape of X by spacing the outer ends of the front leg section 31 and rear leg section 33 of each leg apart in the back and forth direction and coupling the spaced ends by use of the integral joint flange section 38.

According to the crawler frame of each embodiment, since the joint surfaces of the joint flange sections at the inner ends of the legs and the central frame section of the center frame and/or the joint surfaces of the joint flange sections at the outer ends of the legs and the track frames are flat faces, machining of the weld surfaces can be markedly facilitated and, moreover, high-precision high-strength weld surfaces can be attained in spite of easy welding.

According to the first embodiment (see FIG. 5) and the second embodiment (see FIG. 7), the joint flange sections 15S (joint surfaces) at the inner ends of the right and left legs 9R, 9L; 9AR, 9AL are parallel to the right and left side vertical face plates 13R, 13L (joint surfaces) of the central frame section 7 and they are flat faces. The joint flange sections 17F, 17B (joint surfaces) at the outer ends of the front and rear leg sections 15F, 15B of the right and left legs 9R, 9L; 9AR, 9AL are parallel to the right and left track frames 5R, 5L (joint surfaces) and they are flat faces.

All the joint surfaces are thus flat and parallel, so that machining of the weld surfaces can be markedly facilitated and high-precision high-strength weld surfaces can be achieved in spite of easy welding.

According to the third embodiment (see FIG. 8), the right and left side vertical face plates 13R, 13L (joint surfaces) of the central frame section 7A of the center frame 3B are inclined at an angle of θ/2 such that the spacing between the face plates 13R, 13L is long at the front side of the central frame section 7A and short at the rear side of the same, but these face plates are flat faces. The joint flange sections 15S (joint surfaces) at the inner ends of the right and left legs 9BR, 9BL, which are in contact with and parallel to the above inclined faces, are also flat faces. In addition, the joint flange sections 17F, 17B point surfaces) at the outer ends of the front leg section 15F and rear leg section 15B of the right and left legs 9BR, 9BL are parallel to the right and left track frames 5R, 5L (joint surfaces), and they are flat faces.

Accordingly, all the joint surfaces are parallel to their associated joint surfaces and flat, so that machining of the weld surfaces can be markedly facilitated and, moreover, high-precision high-strength weld surfaces can be attained in spite of easy welding.

According to the fourth embodiment (see FIG. 9), the joint flange sections 27a (joint surfaces) at the inner ends of the front right leg 21R, rear right leg 23R, front left leg 21L and rear left leg 23L are parallel to the right and left side vertical face plates 13R, 13L (joint surfaces) of the central frame section 7 of the center frame 3C, and they are flat faces. In addition, the joint flange sections 27b (joint surfaces) at the outer ends of the leg sections 25 of the front right leg 21R, rear right leg 23R, front left leg 21L and rear left leg 23L are parallel to the right and left track frames 5R, 5L (joint surfaces), and they are flat faces.

All the joint surfaces are thus flat and parallel so that machining of the weld surfaces can be significantly facilitated and, moreover, high-precision high-strength weld surfaces can be attained in spite of easy welding.

According to the firth embodiment (see FIG. 10), the joint flange sections 37 (joint surfaces) at the inner ends of the right and left legs 29R, 29L are parallel to the right and left side vertical face plates 13R, 13L (joint surfaces) of the central frame section 7 of the center frame 3D and they are flat. The joint flange sections 37 (joint surfaces) at the outer ends of the front leg section 31 and rear leg section 33 of the right and left legs 29R, 29L are parallel to the right and left track frames 5R, 5L (joint surfaces) and they are flat faces.

All the joint surfaces are thus flat and parallel so that machining of the weld surfaces can be significantly facilitated and, moreover, high-precision high-strength weld surfaces can be attained in spite of easy welding.

It should be noted that both of (i) the joint surfaces of the legs and the central frame section and (ii) the joint surfaces of the legs and the track frames are not necessarily formed from flat faces, but either pair of joint surfaces (i) or (ii) may be flat faces.

The effect described above can be attained by making both joint surfaces flat or by making either of the joint surfaces flat in each pair ((i) or (ii)) of joint surfaces, so that the number of fitting and assembling processes can be reduced.

What is claimed is:

1. A crawler frame for a construction machine, comprising:
a center frame; and
right and left track frames disposed on right and left sides of the center frame, respectively, so as to extend in a back and forth direction of the crawler frame;
wherein the center frame comprises a central frame section and cast steel legs for connecting the central frame section to the track frames; and
wherein top faces of the cast steel legs are convex in cross-section, and the top faces face upward away from a surface on which the construction machine is supported.

2. The crawler frame for a construction machine according to claim 1, wherein the legs of the center frame have a tubular shape.

3. The crawler frame for a construction machine according to claim 1, wherein the legs of the center frame have a cylindrical pipe shape and are circular in cross-section.

4. The crawler frame for a construction machine according to claim 1, wherein a joint flange section joined to the central frame section is provided at an inner end of each leg, and a joint flange section joined to one of the track frames is provided at an outer end of each leg.

5. The crawler frame for a construction machine according to claim 4, wherein at least one of: (i) joint surfaces of the central frame section and the joint flange section at the inner end of each leg , and (ii) joint surfaces of the joint flange section at the outer end of each leg and the corresponding track frame are flat faces.

6. The crawler frame for a construction machine according to claim 4, wherein each of the legs gently widens from the inner end to the outer end thereof.

7. The crawler frame for a construction machine according to claim 2, wherein a joint flange section joined to the central frame section is provided at an inner end of each leg, and a joint flange section joined to one of the track frames is provided at an outer end of each leg.

8. The crawler frame for a construction machine according to claim 3, wherein a joint flange section joined to the central frame section is provided at an inner end of each leg, and a joint flange section joined to one of the track frames is provided at an outer end of each leg.

* * * * *